May 15, 1962 P. C. JANSON 3,034,704
TAMPERPROOF PARKING METER HOUSING STRUCTURE
Filed Aug. 21, 1959 4 Sheets-Sheet 3

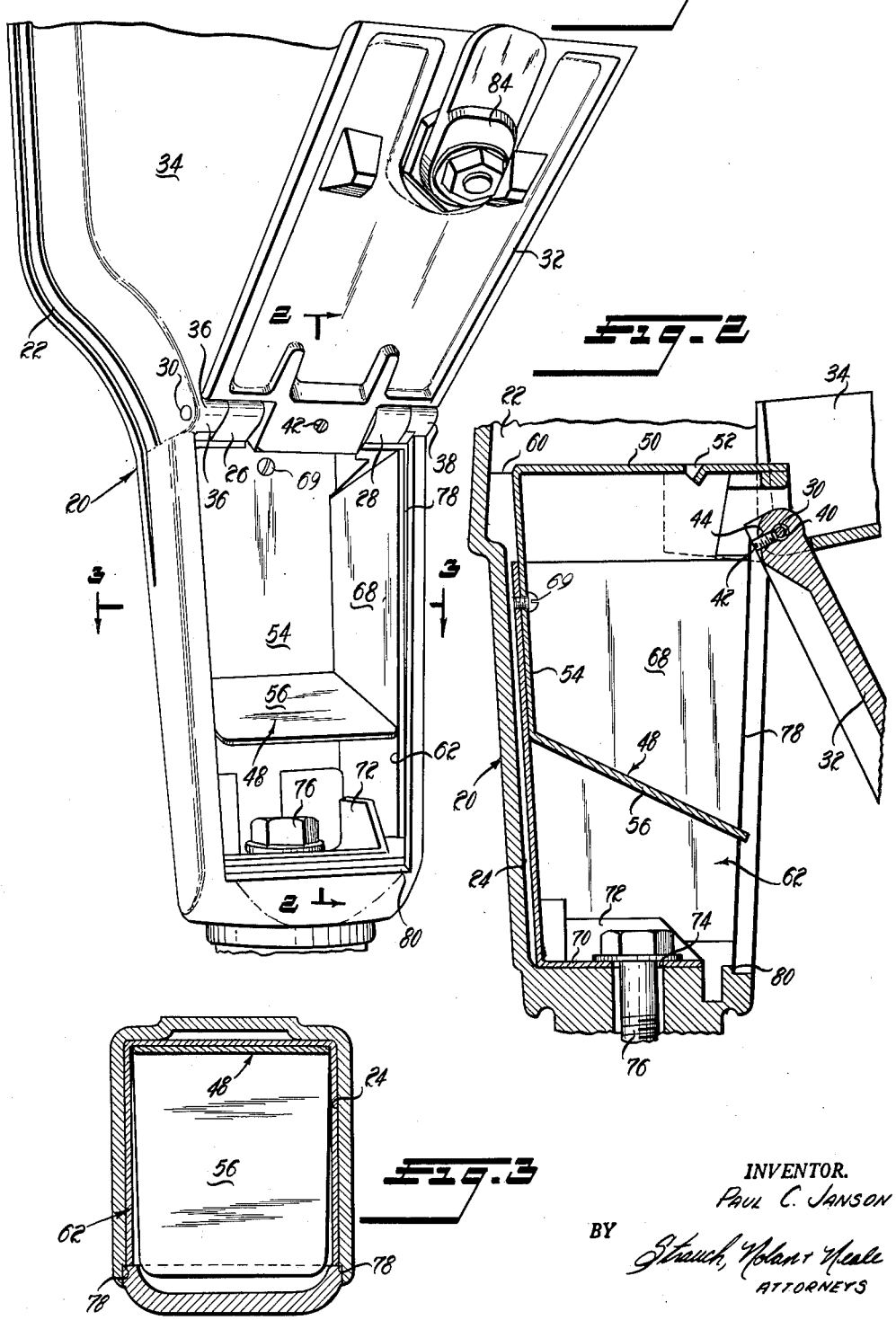

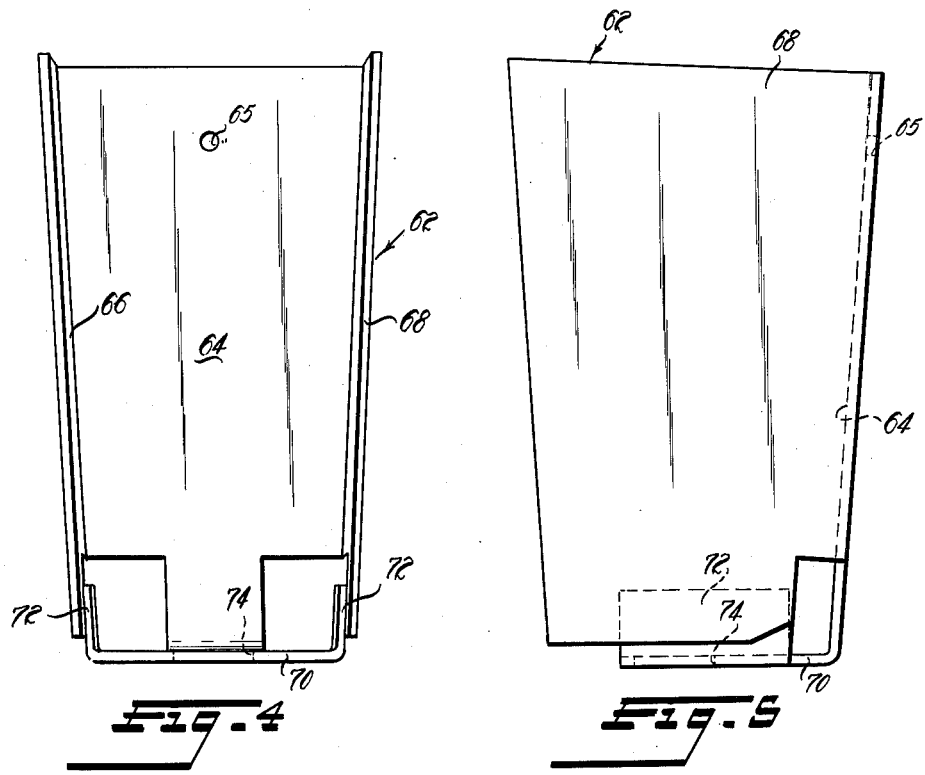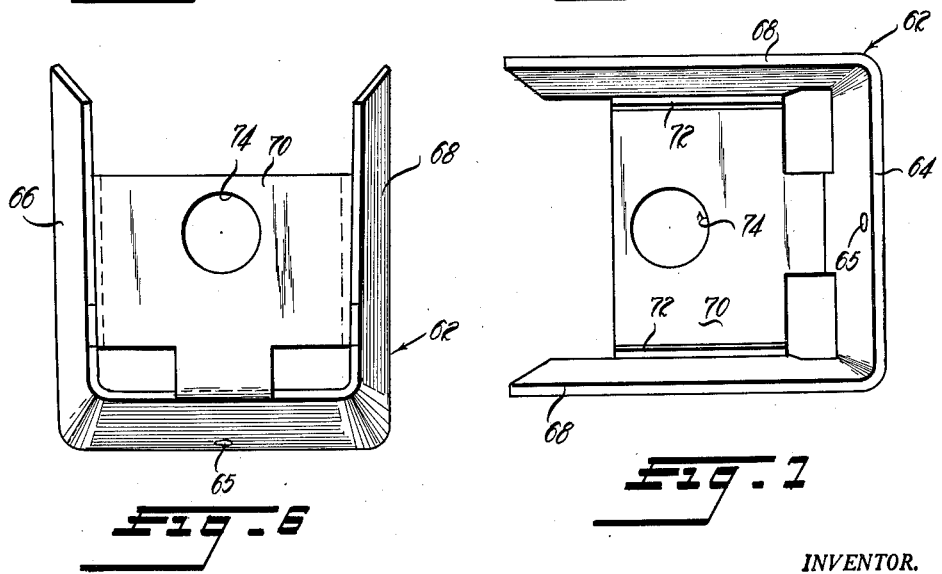

INVENTOR.
PAUL C. JANSON
BY
Strauch, Nolan & Neale
ATTORNEYS

May 15, 1962 P. C. JANSON 3,034,704
TAMPERPROOF PARKING METER HOUSING STRUCTURE
Filed Aug. 21, 1959 4 Sheets-Sheet 4

INVENTOR.
PAUL C. JANSON
BY
ATTORNEYS

United States Patent Office 3,034,704
Patented May 15, 1962

3,034,704
TAMPERPROOF PARKING METER
HOUSING STRUCTURE
Paul C. Janson, Canton, Ohio, assignor to Rockwell Manufacturing Company, Pittsburgh, Pa., a corporation of Pennsylvania
Filed Aug. 21, 1959, Ser. No. 835,281
2 Claims. (Cl. 232—15)

This invention relates to parking meters and more particularly to an improved parking meter housing structure which protects the coins deposited therein from unauthorized removal.

Parking meters are continually under attack by unscrupulous individuals attempting to filch the coins from the coin box, which not only deprives the community of a portion of its revenue by the loss of the fares taken, but also incurs substantial outlays for replacing or repairing the damaged meters. The housings of parking meters are generally made of cast aluminum, so that one common approach in filching coins is destruction of part or all of the meter housing enclosing the coin compartment.

It is therefore a principal object of this invention to provide an improved housing structure for parking meters, which will prevent rapid unauthorized access to coins deposited in it.

A further object is to provide an improved parking meter housing having a steel liner surrounding the coin receiving chamber. Another related object is to provide such an improved meter housing having a cast steel door for the coin chamber.

An additional object is to provide an improved parking meter housing having a recessed door to prevent opening of the door by prying action.

Another object is to provide a single hinge pin for both doors of the meter housing, which cannot be driven out without first gaining access to the interior of the meter housing.

Still another object is to provide a coin chute within the meter housing of such design as to prevent removal of coins from above the steel-lined coil receiving chamber.

These and other objects and advantages will be apparent from the following descriptions of the invention with reference to the accompanying drawings, wherein like reference characters indicate like parts throughout, and in which:

FIGURE 1 is a perspective view of a parking meter showing in detail the coin receiving chamber, the door of which is open and in raised position;

FIGURE 2 is a sectional view along line 2—2 in FIGURE 1;

FIGURE 3 is a sectional view along line 3—3 in FIGURE 1;

FIGURE 4 is a front elevation view of the steel insert liner in the coin receiving chamber shown in FIGURE 1;

FIGURE 5 is a side elevation view of the coin chamber insert liner shown in FIGURE 4 (looking at FIGURE 4 from the right of the drawing);

FIGURE 6 is a bottom plan view of the coin chamber insert liner shown in FIGURE 4;

FIGURE 7 is a top plan view of the coin chamber insert liner (looking down on the liner in FIGURE 5 of the drawing);

Figure 11:
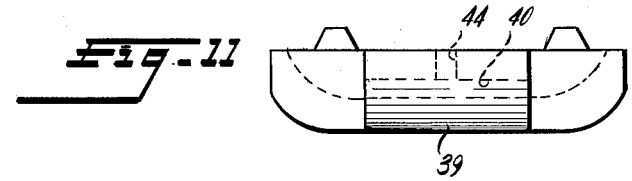
FIGURE 11 is a top plan view of the cast steel door shown in FIGURE 8.

Referring to the drawings, especially FIGURES 1-3, there is shown a conventional parking meter having a main outer housing 20, which is usually made of cast aluminum, and includes an upper enlarged section 22 forming half of the upper meter chamber, which receives the usual timer and coin mechanism, and a lower smaller section forming a coin receiving chamber 24.

The meter housing 20 is provided with ears 26 and 28 having aligned bores to receive a pin 30 to provide a hinge for the lower door 32 and the dished upper cover portion 34 for the main meter chamber 22. The pin 30 is received in the bores in ears 26 and 28, and aligned bores in ears 36 and 38 formed at the bottom of upper chamber cover 34, and also in bore 40 of door 32, thereby hingedly mounting door 32 and upper meter chamber cover 34 on the main meter housing 20. A screw 42 is threaded into tapped hole 44, which intersects bore 40 in lower door 32; and the end of the screw, which is hardened, projects into a groove 46 in pin 30. Thus, the hinge pin 30 cannot be driven out of the hinge hole from the exterior of the meter, as one must first remove screw 42, which can only be done from the interior of door 32.

FIGURES 4-7 show in detail the construction of the novel steel reinforcing insert 62 which is disposed within the lower chamber 24 of the cast aluminum parking meter housing 20, as shown in FIGURES 1-3. The reinforcing insert 62 is fabricated from a single piece of sheet steel which is bent in such a manner that it is shaped as in FIGURES 4-7, and includes a rear wall 64 having turned-in side walls 66 and 68, and bottom wall 70 to form a liner for three sides of the lower housing chamber 24. Bottom wall 70 has flap members 72 which are spot welded to side portions 66 and 68, and is also provided with an aperture 74 to permit the passage of the meter mounting draw bolt 76 shown in FIGURES 1 and 2. The insert 62 is adapted to fit tightly within the lower housing chamber 24 to form a coin receiving chamber bounded on four sides by steel walls.

Figure 13:
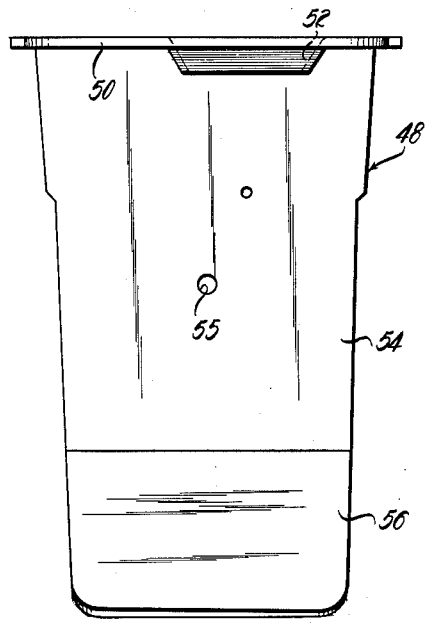
FIGURE 13 is a front elevation view of a simplified coin chute for the coin receiving chamber of the meter.
Figure 14:
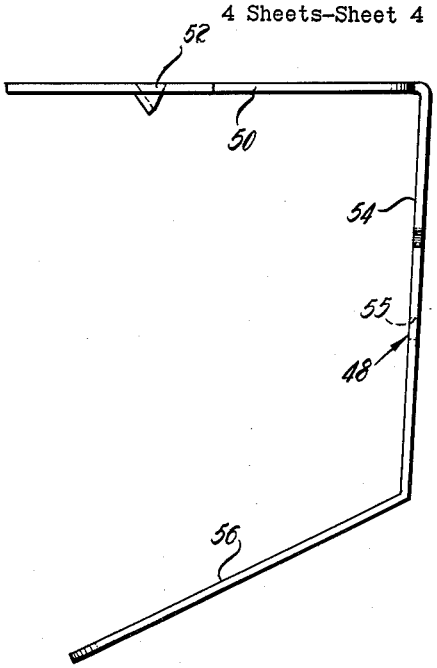
FIGURE 14 is a side elevation view of the coin chute shown in FIGURE 13 (looking at FIGURE 13 from the right in the drawing)
Figure 15:
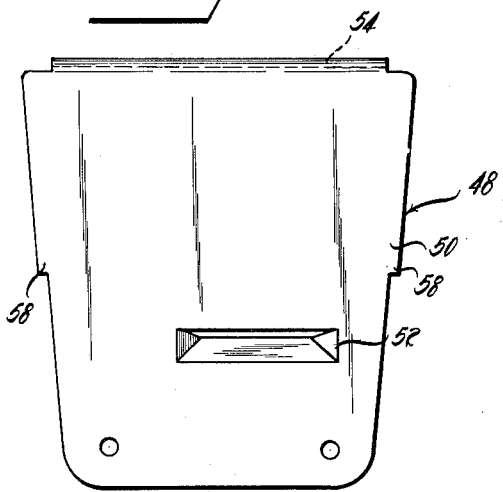
FIGURE 15 is a top plan view of the coin chute shown in FIGURES 13 and 14.
Figure 16:
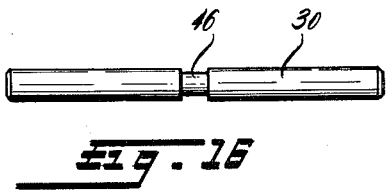
FIGURE 16 is a plan view of the hinge pin for the meter doors.

As shown in FIGURES 1-3 and 13-15, the improved coin chute 48 comprises a single piece of sheet steel, which is substantially U-shaped, and includes a top portion 50 having a slot 52 to provide a coin passage, a back portion 54, and a slanted bottom portion 56. The top portion 50 is provided with wing members or shoulders 58 which engage ledges 60 on opposite sides of the interior wall of upper enlarged meter chamber 22, to suspend the coin chute 48 within the meter housing. As will be apparent, the coin chute 48 can be inserted or removed from chamber 24 only through the upper portion 22 of the meter housing 20, after unlocking cover 34. The back wall 64 of the coin chamber insert 62 is provided with a tapped hole 65. The back wall 54 of the coin chute 48 is also provided with a punched hole 55, which coincides with tapped hole 65 in insert 62 when the chute is inserted in the coin receiving chamber of the meter, as shown in FIGURE 2. A small screw 69 is passed through hole 55 and threaded into the tapped hole 65 so that the chute is secured to steel insert 62 and cannot be removed without first opening the usual lock which secures the dished cover 34 to the upper meter housing chamber 22 and removing this screw. The insert 62 and coin chute 48 thereby provides a coin receiving chamber surrounded by high tensile strength metal wall portions on all sides, when door 32 is closed.

Figure 9:
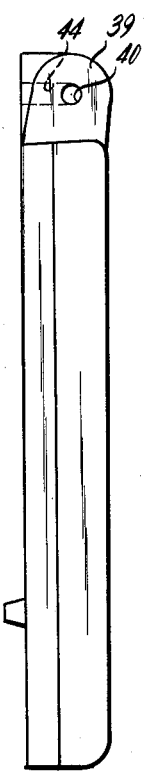
FIGURE 9 is a side elevation view of the cast steel door shown in FIGURE 8 (looking at FIGURE 8 to the right in the drawing)
Figure 8:
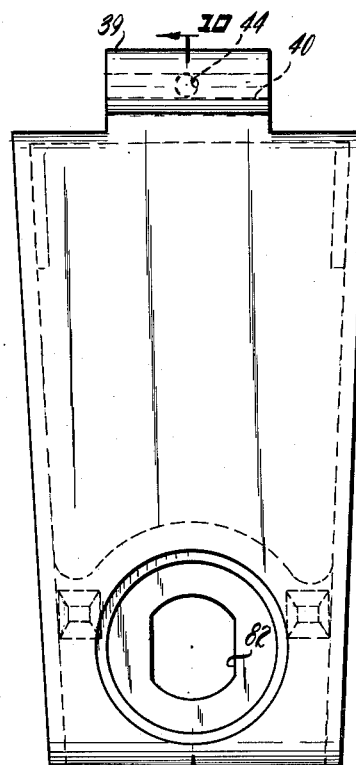
FIGURE 8 is a front view of the cast steel door for the coin receiving chamber shown in FIGURE 1.
Figure 10:
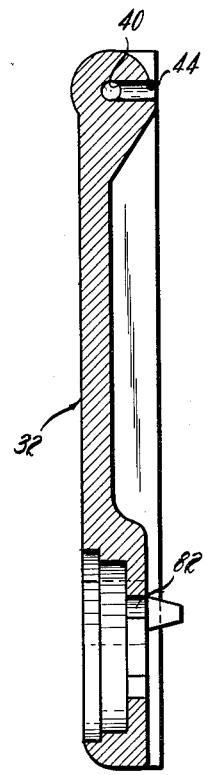
FIGURE 10 is a sectional view along line 10—10 in FIGURE 8.
Figure 12:
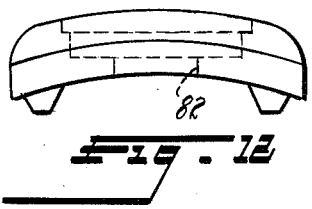
FIGURE 12 is a bottom plan view of the cast steel door shown in FIGURE 8.

As can be seen in FIGURES 1-3, the insert side walls 66 and 68 extend from the rear wall 64 so that their edges are flush with side ridges 78 cast into the meter housing 20, thereby forming, with bottom ridge 80 also cast in housing 20, a recessed seat for the steel coin removal door 32. As shown in detail in FIGURES 8-12, the coin removal door 32 is a heavy steel casting having a trapezoidal configuration and provided with an aperture 82 for receiving a lock mechanism 84. Integral with the upper end of door 32 is a hinge portion 39 having bore 40 therethrough to receive the hinge pin 30, which is locked by set screw 42 in transverse hole 44, as previously described. When the door 32 is in its closed position, it is received snugly into the recessed seat 78—80—78, so that the joint between the inner surface of the door and the edges of walls 66 and 68 and ridges 78 and 80, is inaccessible from the outside of the meter, thus rendering it virtually impossible to pry open the door 32 by insertion of a tool between the door and meter housing.

It will be apparent from the foregoing that the insert 62, together with the coin chute 48 and door 32, forms a coin receiving chamber bounded on all six sides by steel walls. This provides a novel improved parking meter housing with a coin receiving chamber substantially completely surrounded by steel, the steel door being recessed into the side walls so that it cannot be pried, and mounted on a hinge pin which can only be removed from the inside of the chamber; and that this invention therefore provides an improved meter housing construction of great invulnerability to breakage and vandalism.

In a general manner, while there has been disclosed in the above description, what is deemed to be the most practical and efficient embodiment of the invention, it should be well understood that the invention is not limited to such embodiment as there might be changes made in the arrangement disposition and form of the parts without departing from the principles of the present invention as comprehended within the scope of the accompanying claims.

What is claimed is:

1. In a parking meter comprising a housing having an interior coin receiving chamber with bottom, rear and side walls, a coin removal opening for permitting access to said interior chamber, and means located at the bottom of said meter for anchoring said meter in place, the improvement comprising a high tensile strength casing for said coin receiving chamber comprising a reinforcing insert of high tensile strength closely lining said interior chamber along the sides and bottom thereof, the bottom wall of said insert having an opening therein for engagement with said anchoring means to secure it in said chamber, a high tensile strength door pivotally mounted at one edge of said coin removal opening, recesses along the edges of said opening for receiving the corresponding edges of said door, locking means on said door, a coin chute in said chamber having a coin passage therein, said coin chute being positioned in said chamber to form a closed high tensile strength interior for said chamber with said door and reinforcing insert, and means comprising shoulders on said coin chute suspending said coin chute in said housing for preventing removal of said coin chute through said coin removal opening.

2. A parking meter as defined in claim 1, wherein said door is pivotally mounted on said housing by hinge means comprised of a pivot pin, and means inaccessible from the exterior of said housing for locking said pin against axial displacement.

References Cited in the file of this patent
UNITED STATES PATENTS

| | | |
|---|---|---|
| 94,761 | McFarland | Sept. 14, 1869 |
| 1,294,838 | Schriefer | Feb. 18, 1919 |
| 2,153,868 | Hunter | Apr. 11, 1939 |
| 2,570,920 | Clough | Oct. 9, 1951 |
| 2,779,534 | Jones | Jan. 29, 1957 |